(12) United States Patent
Sakurai et al.

(10) Patent No.: US 10,249,907 B2
(45) Date of Patent: Apr. 2, 2019

(54) NONAQUEOUS ELECTROLYTE SECONDARY BATTERY, METHOD FOR PRODUCING SAME AND NONAQUEOUS ELECTROLYTE

(71) Applicant: TOYOTA JIDOSHA KABUSHIKI KAISHA, Toyota-shi, Aichi (JP)

(72) Inventors: Takahiro Sakurai, Toyota (JP); Hiroyasu Kado, Seto (JP); Hirohiko Morikawa, Toyota (JP); Hisanao Kojima, Kariya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 128 days.

(21) Appl. No.: 15/125,797

(22) PCT Filed: Feb. 23, 2015

(86) PCT No.: PCT/JP2015/000879
§ 371 (c)(1),
(2) Date: Sep. 13, 2016

(87) PCT Pub. No.: WO2015/136855
PCT Pub. Date: Sep. 17, 2015

(65) Prior Publication Data
US 2017/0222263 A1    Aug. 3, 2017

(30) Foreign Application Priority Data

Mar. 14, 2014    (JP) ................................. 2014-052548

(51) Int. Cl.
*H01M 10/05*    (2010.01)
*H01M 10/0567*    (2010.01)
(Continued)

(52) U.S. Cl.
CPC ......... *H01M 10/0567* (2013.01); *H01M 4/13* (2013.01); *H01M 4/62* (2013.01);
(Continued)

(58) Field of Classification Search
CPC ........... H01M 10/0567; H01M 10/054; H01M 2300/0025
See application file for complete search history.

(56) References Cited

U.S. PATENT DOCUMENTS

2009/0286162 A1* 11/2009 Lamanna ............ H01M 10/052
429/307
2015/0207173 A1    7/2015 Onizuka

FOREIGN PATENT DOCUMENTS

CN    103208653 A    7/2013
CN    104022310 A    9/2014
(Continued)

*Primary Examiner* — Ula C Ruddock
*Assistant Examiner* — Frank A Chernow
(74) *Attorney, Agent, or Firm* — Sughrue Mion, PLLC

(57) ABSTRACT

Provided is a nonaqueous electrolyte secondary battery with better battery performance than in the past, by forming an SEI coat with very little non-uniformity on the surface of the negative electrode active material layer. The invention provides a nonaqueous electrolyte secondary battery in which an electrode assembly including a positive electrode, a separator, and a negative electrode, and a nonaqueous electrolyte are contained in a battery case. In this secondary battery, the nonaqueous electrolyte contains a crown ether that forms a complex with a sodium ion, and the negative electrode includes a negative current collector, a negative electrode active material layer containing a negative electrode active material formed on the surface of the current collector, and a coat including an oxalato complex structure and provided on at least part of the surface of the negative electrode active material layer.

10 Claims, 4 Drawing Sheets

(51) Int. Cl.

| | |
|---|---|
| *H01M 4/13* | (2010.01) |
| *H01M 4/62* | (2006.01) |
| *H01M 10/052* | (2010.01) |
| *H01M 10/054* | (2010.01) |
| *H01M 10/0587* | (2010.01) |
| *H01M 4/36* | (2006.01) |
| *H01M 10/04* | (2006.01) |
| *H01M 10/44* | (2006.01) |

(52) U.S. Cl.
 CPC ....... *H01M 10/052* (2013.01); *H01M 10/054* (2013.01); *H01M 10/0587* (2013.01); *H01M 4/366* (2013.01); *H01M 10/0431* (2013.01); *H01M 10/446* (2013.01); *H01M 2300/0025* (2013.01); *Y02T 10/7011* (2013.01)

(56) References Cited

FOREIGN PATENT DOCUMENTS

| | | |
|---|---|---|
| JP | 2000-306602 A | 11/2000 |
| JP | 2008-305705 A | 12/2008 |
| JP | 2013-165049 A | 8/2013 |
| WO | 2013/151096 A1 | 10/2013 |
| WO | 2014/038245 A1 | 3/2014 |

\* cited by examiner

EXAMPLE A   EXAMPLE B

NONAQUEOUS ELECTROLYTE SECONDARY BATTERY, METHOD FOR PRODUCING SAME AND NONAQUEOUS ELECTROLYTE

CROSS REFERENCE TO RELATED APPLICATIONS

This application is a National Stage of International Application No. PCT/JP2015/000879 filed Feb. 23, 2015, claiming priority based on Japanese Patent Application No. 2014-052548 filed Mar. 14, 2014, the contents of all of which are incorporated herein by reference in their entirety.

TECHNICAL FIELD

The present invention relates to a nonaqueous electrolyte secondary battery, method for manufacturing the same, and a nonaqueous electrolyte used therein.

The present application claims priority based on Japanese Patent Application No. 2014-052548 filed on Mar. 14, 2014 and the entire content thereof is incorporated in the present application as reference.

BACKGROUND ART

Lithium secondary batteries and other nonaqueous electrolyte secondary batteries are smaller and more lightweight than conventional batteries, and they have a higher energy density and superior output density. As a result, they are now preferred for use in all kinds of portable power sources for personal computers and portable terminals and the like, and as power sources for the drives of vehicles such as hybrids.

These types of nonaqueous electrolyte secondary batteries are configured with an electrode assembly comprising a positive electrode and a negative electrode interposed by a separator, and an electrolyte that are contained in a battery case. The positive and negative electrodes each feature an electrode active material layer (specifically, a positive electrode active material layer and a negative electrode active material layer) mainly comprising an active material that can reversibly absorb and desorb a charge carrier (typically a lithium ion) at its corresponding positive or negative current collector. Furthermore, the constructed battery typically undergoes an initial charge/discharge treatment under suitable conditions to be adjusted for actual use.

However, during the initial charge/discharge treatment a solid electrolyte interface (SEI) coat is formed on the surface of the negative electrode active material by reductive decomposition of part of the nonaqueous electrolyte at the negative electrode. The presence of this SEI coat can prevent subsequent decomposition of the nonaqueous electrolyte. Therefore, the formation of a predetermined coat can prevent the deterioration of battery characteristics, protect against overcharging, and the like, and improve cycling characteristics and other battery performance. However, the charge carrier that is depleted by this reaction becomes an irreversible capacity, so the formation of the coat can cause a drop in battery capacity. Therefore, an additive that decomposes at or below the decomposition potential of the nonaqueous electrolyte and can form a coat on the surface of the negative electrode active material (hereinafter, referred to as a "coat-forming agent") is commonly added beforehand to the nonaqueous electrolyte to form a stable coat on the surface of the negative electrode active material layer at the start of the initial charge/discharge. For example, Patent Documents 1 and 2 disclose nonaqueous electrolyte secondary batteries containing, in a nonaqueous electrolyte, an oxalato complex compound (typically lithium bis(oxalato) borate, also referred to herein as "LiBOB") as the coat-forming agent.

CITATION LIST

Patent Literature

PTL 1: Japanese Patent Application Publication No. 2008-305705
PTL 2: Japanese Patent Application Publication No. 2013-165049
PTL 3: Japanese Patent Application Publication No. 2000-306602
PTL 4: International Publication No. WO 2013/151096

SUMMARY OF INVENTION

Technical Problem

When the electrode assembly and nonaqueous electrolyte are placed in the battery case during the manufacture of the battery, however, the nonaqueous electrolyte begins to infiltrate into the electrode assembly. It has been determined that a coat-forming agent added to the nonaqueous electrolyte can be the cause of non-uniform infiltration into the active material layer at that time. Performing the initial charge/discharge treatment when the coat-forming agent has infiltrated the active material layer unevenly causes the undesirable result of non-uniformity of the SEI coat formed on the surface of the negative electrode active material layer. Especially in the kind of large (high capacity) battery that is used as a power source for a hybrid automobile and the like, this phenomenon of non-uniform infiltration of the coat-forming agent can become quite apparent because of the large surface area of the electrode.

In consideration of this matter, an object of the present invention is to provide a nonaqueous electrolyte secondary battery wherein the non-uniformity of infiltration of the coat-forming agent into the negative electrode active material layer is prevented. Other objects of the present invention are to provide a nonaqueous electrolyte that can be used suitably in such a nonaqueous electrolyte secondary battery and to provide a method for manufacturing a nonaqueous electrolyte secondary battery wherein the non-uniformity of infiltration of the coat-forming agent is prevented.

Solution to Problem

After repeated and incisive research, the inventors have concluded that the problem of non-uniformity of infiltration of the coat-forming agent arises because typically the positive electrode, the negative electrode, and the separator constituting the electrode assembly inevitably contain sodium components that originate in various types of additives. The sodium components are easy to be eluted into a nonaqueous electrolyte. As a result, when the nonaqueous electrolyte infiltrates the electrode assembly during the manufacture of the battery, sodium ions escape from the negative electrode into the nonaqueous electrolyte that has previously infiltrated in the active material layer (in this case, the negative electrode active material layer). The oxalato complex compound, such as LiBOB, added to the nonaqueous electrolyte subsequently infiltrates the negative electrode active material layer after sodium ions. When these sodium ions and the oxalato complex compound subsequently infiltrating are present together, they react and an insoluble salt such as NaBOB precipitates. This precipitate is believed to concentrate in the center in the widthwise direction when, for example, the sodium ions and the oxalato complex compound, which have infiltrated from both ends, are present together. Such an insoluble precipitate hinders further infiltration of the oxalato complex compound, and it is not easily decomposed by the initial charge/discharge treatment.

FIG. 6 is a graph that illustrates the distribution of LiBOB that has precipitated in the negative electrode active material layer in the widthwise direction (the direction of nonaqueous electrolyte infiltration). This negative electrode active material layer has a structure wherein the nonaqueous electrolyte infiltrates widthwise toward the "center" from both edges (i.e., from both sides in the direction of the X-axis of the graph), which are indicated in the drawing by "− terminal side" and "+ terminal side." Therefore, when an insoluble salt precipitates at the center in the widthwise direction, the oxalato complex compound (LiBOB) is not able to infiltrate into the center as shown in FIG. 6. As a result, the coat derived from LiBOB may not be formed after the initial charge/discharge treatment, and locations where the LiBOB concentration is extremely low may be formed. There is a problem because when non-uniform infiltration of this oxalato complex compound and non-uniform precipitation of the insoluble salt occur, a high current will flow through parts with smaller amounts of the coat derived from the oxalato complex component such as the center in the widthwise direction of the negative electrode during charge/discharge, the negative electrode active material will deteriorate locally, and battery performance will decrease.

Thus, to realize the above object the present invention provides a nonaqueous electrolyte secondary battery in which an electrode assembly including a positive electrode, a separator, and a negative electrode, and a nonaqueous electrolyte are contained in a battery case. The present invention is characterized in that the nonaqueous electrolyte, in the nonaqueous electrolyte secondary battery, contains a crown ether that forms a complex with sodium ions, and the negative electrode includes a negative current collector, a negative electrode active material layer containing a negative electrode active material formed on the surface of the current collector and a coat derived from the oxalato complex component that is provided on at least part of the surface of the negative electrode active material layer.

More specifically, in the nonaqueous electrolyte secondary battery disclosed herein, the sodium ions that leach into the nonaqueous electrolyte from the electrode assembly are trapped by forming a complex with the crown ether. Therefore, the coat derived from the oxalato complex component, which is a polymeric decomposition product of the oxalato complex compound used as a coat-forming agent, is provided on the surface of the negative electrode active material layer as a more homogenous and uniform coat without the presence of an oxalato complex sodium salt. Current variations during charge/discharge are prevented in the negative electrode active material layer of a secondary battery of this configuration. As a result, localized degradation of the negative electrode active material layer is prevented and a nonaqueous electrolyte secondary battery with better cycling characteristics and other battery performance than in the past is provided.

The term "coat derived from the oxalato complex component" refers to a coat that is formed from the oxalato complex serving as an origin, and at least part of the coat comprises an element, chemical structure (e.g., a chemical bond) or constituent component that forms the oxalato complex. Typically, this means that the coat con-stitutes, for example, a decomposition product of the oxalato complex compound as well as a reaction product between one or multiple compounds and the oxalato complex compound. Moreover, the presence of this coat can be confirmed by various types of structural analyses, preferably the Tetralogy of Fallot-SIMS (TOF-SIMS) method described below.

Patent Documents 3 and 4 disclose adding a crown ether to the nonaqueous electrolyte in a lithium secondary battery. The former specifically states that the crown ether was used to achieve high-temperature stabilization of the coat on the surface of the negative electrode. The latter discloses using the crown ether to form a complex with a transition metal cation that leaches from the positive electrode active material under severe operating conditions, and it states that this transition metal cation can prevent deposition on the negative electrode. However, neither document discloses that a crown ether improves infiltration into the negative electrode active material layer of an oxalato complex compound contained in the nonaqueous electrolyte and forms a uniform coat derived from the oxalato complex component on the negative electrode. The kind of effect of the present invention is based on an entirely new understanding that was first discovered through the technology disclosed herein.

In a preferred mode of the nonaqueous electrolyte secondary battery disclosed herein, the crown ether is characterized in that it contains carbon atoms, oxygen atoms, and hydrogen atoms, and the ring structure of the crown ether is formed of carbon-carbon bonds or ether bonds between the carbon atoms and the oxygen atoms. This configuration is preferred because the crown ether can trap the sodium ions that have leached into the nonaqueous electrolyte, strongly make the sodium ions solvate, and form an extremely stable complex therewith.

One preferred mode of the nonaqueous electrolyte secondary battery disclosed herein is characterized in that the formula $0<A/X \leq 2$ is satisfied, when the number of moles of sodium ions that leach into the nonaqueous electrolyte from the electrode assembly is assigned a value X mol and the number of moles of crown ether contained in the nonaqueous electrolyte is assigned a value of A mol. More preferably, the number of moles of the sodium ions X and the number of moles of the crown ether A satisfy the formula $0.5 \leq A/X \leq 1.2$. The non-uniformity of infiltration of the nonaqueous electrolyte into the negative electrode active material layer can be reduced even more thereby. As a result, a uniform coat can be formed by the coat-forming agent on the surface of the negative electrode active material layer, and battery performance can be improved by reducing the variations in electric current.

In one preferred mode of the nonaqueous electrolyte secondary battery disclosed herein, the coat comprises at least one of boron (B) and phosphorus (P) as a constituent atom of the oxalato complex component. A high quality coat can be formed by using oxalato borates that contain boron and oxalato phosphates that contain phosphorus as the oxalato complex.

One preferred mode of the nonaqueous electrolyte secondary battery disclosed herein is characterized in that the nonaqueous electrolyte additionally contains an oxalato complex compound having an oxalato complex component of common origin with the coat. In such a secondary battery, the coat is typically formed on the surface of the negative electrode (negative electrode active material layer) by a coat-forming agent that has been added to the nonaqueous electrolyte. The coat-forming agent may be consumed as the coat is formed and disappear completely, but a mode wherein coat-forming agent remains in the nonaqueous electrolyte may be also preferred. As a result, when the oxalato complex compound remains in the nonaqueous electrolyte in this manner as the coat-forming agent, the nonaqueous electrolyte contains an oxalato complex compound having an oxalato complex component of common origin with the coat. Therefore, even if conditions arise such as unexpected cracks in the negative electrode active material and detachment of the active material layer, for example, a new coat can be formed by the oxalato complex compound that remains in the nonaqueous electrolyte on the fresh surface exposed by the cracks.

In one preferred mode of the nonaqueous electrolyte secondary battery disclosed herein, the oxalato complex units contained in the coat and in the nonaqueous electrolyte is characterized by having a ratio of 0.001 to 0.1 mol/L with respect to 1 L of the nonaqueous electrolyte. Inside the battery case of the secondary battery, the oxalato complex compound added during the manufacture of the battery can either remain unchanged or be a decomposition product that has been broken down by the cell reaction (can be a decomposition reactant). Typically, the decomposition product can be in the form of a coat formed on the surface of the negative electrode. Therefore, preferably the oxalato complex compound and its decomposition product are both contained in the above concentration range, and together are referred to as the oxalato complex unit of concentration. In other words, preferably the oxalato complex compound in the nonaqueous electrolyte lies within the above concentration range when the nonaqueous electrolyte is prepared. As a result, not only can an appropriate amount of coat be formed on the negative electrode active material layer coat, but also an increase in internal resistance can be prevented, and the improved effects on cycling characteristics and other battery properties can be obtained in good balance.

In one preferred mode of the nonaqueous electrolyte secondary battery disclosed herein, the above oxalato complex compound is characterized in that it contains lithium bis(oxalato)borate (LiBOB; $LiB(C_2O_4)_2$). Among the oxalato complex compounds, LiBOB is a compound that does not easily infiltrate the negative electrode active material layer. Therefore, this mode is preferred because the infiltration improving effect of LiBOB can be prominently expressed by using the configuration disclosed herein.

One preferred mode of the nonaqueous electrolyte secondary battery disclosed herein is characterized in that, in the positive electrode, a positive electrode active material layer is formed on an elongate positive current collector along the lengthwise direction of the positive current collector; in the negative electrode, a negative electrode active material layer is formed on an elongate negative current collector along the lengthwise direction of the negative current collector; and the electrode assembly is a wound electrode assembly prepared by laminating the elongate positive and negative electrodes opposing each other, and then winding the laminated positive and negative electrodes in the lengthwise direction, in other words, with the widthwise direction orthogonal to the lengthwise direction as the winding axis. If the configuration of the current collectors has a laminated structure wherein the positive electrode and negative electrode face each other in multiple layers, infiltration of the nonaqueous electrolyte and the oxalato complex compound is more easily prevented. In addition, infiltration is even more easily prevented if this laminated structure is wound because winding limits the direction of infiltration of the oxalato complex compound. Therefore, this is preferred because even with the use of the configuration disclosed herein in a secondary battery comprising a wound electrode assembly, the effect of improving infiltration of the oxalato complex compound can be prominently exhibited.

In another aspect, the present invention provides a nonaqueous electrolyte to be used in a nonaqueous electrolyte secondary battery wherein an electrode assembly featuring a positive electrode, separator, and negative electrode, and a nonaqueous electrolyte are housed in a battery case. This nonaqueous electrolyte is characterized in that it contains an electrolyte, a solvent to dissolve the electrolyte, an oxalato complex compound as a coat-forming agent, and a crown ether as a sodium-trapping agent.

The nonaqueous electrolyte contains the oxalato complex compound as a coat-forming agent. Because this oxalato complex compound reacts and forms an insoluble salt with sodium ions that leach inevitably from the electrode assembly, infiltration of the nonaqueous electrolyte into the electrode assembly, especially into the negative electrode active material layer, is prevented. The nonaqueous electrolyte contains a crown ether as a sodium-trapping agent together with the oxalato complex compound. Therefore, the sodium-trapping agent captures sodium ions that cause poor infiltration of the oxalato complex compound. As a result, poor infiltration and non-uniformity of the infiltration of the coat-forming agent are improved by this nonaqueous electrolyte, and a uniform film can be formed on the surface of the negative electrode. Moreover, a battery that can realize excellent cycling characteristics and other battery performance can be constructed thereby.

In one preferred mode of the nonaqueous electrolyte disclosed herein, the nonaqueous electrolyte is characterized in that when the concentration of the crown ether contained in the nonaqueous electrolyte is assigned a value of C (mol/L), the amount of the nonaqueous electrolyte placed in the nonaqueous electrolyte secondary battery is assigned a value of Z (L), and the number of moles of sodium ions that will leach into the nonaqueous electrolyte from the electrode assembly is assigned a previously determined value of X mol, these values are adjusted to satisfy the formula $0<C*Z/X \leq 2$. More preferably, the concentration of the crown ether C, the amount of the nonaqueous electrolyte Z, and the number of moles of the sodium ions X are adjusted to satisfy the formula $0.5 \leq C*Z/X \leq 1.2$.

This configuration provides a nonaqueous electrolyte that can contain a more suitable amount of crown ether and can exhibit even more superb battery performance.

In another aspect, the present invention provides a manufacturing method for a nonaqueous electrolyte secondary battery in which an electrode assembly including a positive electrode, a separator, and a negative electrode, and a nonaqueous electrolyte are contained in a battery case. This manufacturing method comprises the steps of: placing an electrode assembly in a battery case to construct a battery assembly; injecting a nonaqueous electrolyte into the battery case; and performing an initial charge/discharge treatment on the battery assembly. Moreover, the nonaqueous electrolyte is characterized in that it contains an electrolyte, a solvent to dissolve the electrolyte, an oxalato complex compound as a coat-forming agent, and a crown ether as a sodium-trapping agent.

According to this configuration, a secondary battery is constructed using a nonaqueous electrolyte that contains both a coat-forming agent and a sodium-trapping agent. Therefore, when the nonaqueous electrolyte infiltrates the electrode assembly, the sodium ions that leach from the electrode assembly are captured by the sodium-trapping agent. As a result, further blocking of the infiltration of the coat-forming agent, which has a relatively slow infiltration rate into the negative electrode (negative electrode active material layer) is prevented. Moreover, when the coat-forming agent has penetrated homogenously and uniformly, a more homogenous, higher quality coat can be formed on the surface of the negative electrode by carrying out the initial charge/discharge treatment. Thus, a secondary battery with even better battery performance can be manufactured thereby.

One preferred embodiment of the manufacturing method disclosed herein is characterized in that when the concentration of the crown ether contained in the nonaqueous electrolyte is assigned a value of C (mol/L), the amount of the nonaqueous electrolyte contained in the nonaqueous electrolyte secondary battery is assigned a value of Z (L), and the number of moles of sodium ions that leach into the nonaqueous electrolyte from the electrode assembly is assigned a previously determined value of X mol, these values are adjusted to satisfy the formula $0 < C*Z/X \leq 2$. Preferably, the concentration of the crown ether C, the amount of the nonaqueous electrolyte Z, and the number of moles of the sodium ions X are adjusted to satisfy the formula $0.5 \leq C*Z/X \leq 1.2$.

This configuration provides a secondary battery that can contain a more suitable amount of crown ether in the nonaqueous electrolyte and can exhibit even more superb battery performance.

The technology disclosed herein enables the formation of a homogenous coat (a coat with uniformity or little non-uniformity) on the negative electrode. Such a coat makes it possible to prevent non-uniformity of the current flowing through the negative electrode, which contributes to the realization of high battery performance. A uniform current is particularly preferred in a nonaqueous electrolyte secondary battery for high capacity, high output applications such as the power source (power supply) for a drive motor that is mounted in a vehicle. The technology disclosed herein can be preferably applied to a nonaqueous electrolyte secondary battery to be used as a power source for a vehicle drive motor.

DESCRIPTION OF EMBODIMENTS

The term "nonaqueous electrolyte secondary battery" in the description of the present invention refers to a secondary battery comprising a charge carrier in a nonaqueous electrolyte solution. Moreover, "secondary battery" is a term that includes not only all chemical batteries such as lithium secondary batteries, nickel hydroxide batteries, nickel cadmium batteries, lead acid batteries, etc., but also storage elements that can be used in the same industrial field as a chemical battery (e.g., a lithium secondary battery) such as a pseudocapacitor or redox capacitor, and combinations thereof such as a hybrid capacitor or lithium ion capacitor, and the like. The term "lithium-ion secondary battery" refers to a secondary battery that uses lithium ions as electrolytic ions and is charged and discharged by the transfer of lithium ions (charge transfer) between the positive and negative electrodes. Secondary batteries that are generally called lithium-ion batteries, lithium polymer batteries, and the like are typical examples of the lithium secondary battery in the description of the present invention. Furthermore, the term "active material" in the description of the present invention refers to a material or compound that can reversibly absorb and desorb a chemical species (lithium ions in the case of a lithium secondary battery) that serves as the charge carrier at the positive electrode or negative electrode side thereof.

The symbol "≤" refers to Less than or equal to sign and the symbol "*" refers to Multiplication sign, as mathematical symbols.

The nonaqueous electrolyte secondary battery disclosed herein is described below through examples of one preferred embodiment of a lithium secondary battery. Because the configuration of the nonaqueous electrolyte secondary battery disclosed herein is closely related to its manufacturing method, it will be described together with the manufacturing method. It should be understood, however, that the present invention is not limited to these examples. Matters necessary for carrying out the present invention other than those specifically discussed herein are understood to be matters of design for a person skilled in the art based on the prior art in this field. The construction of the nonaqueous electrolyte secondary battery can be carried out based on the content disclosed herein and common technical knowledge in this field.

Figure 1:
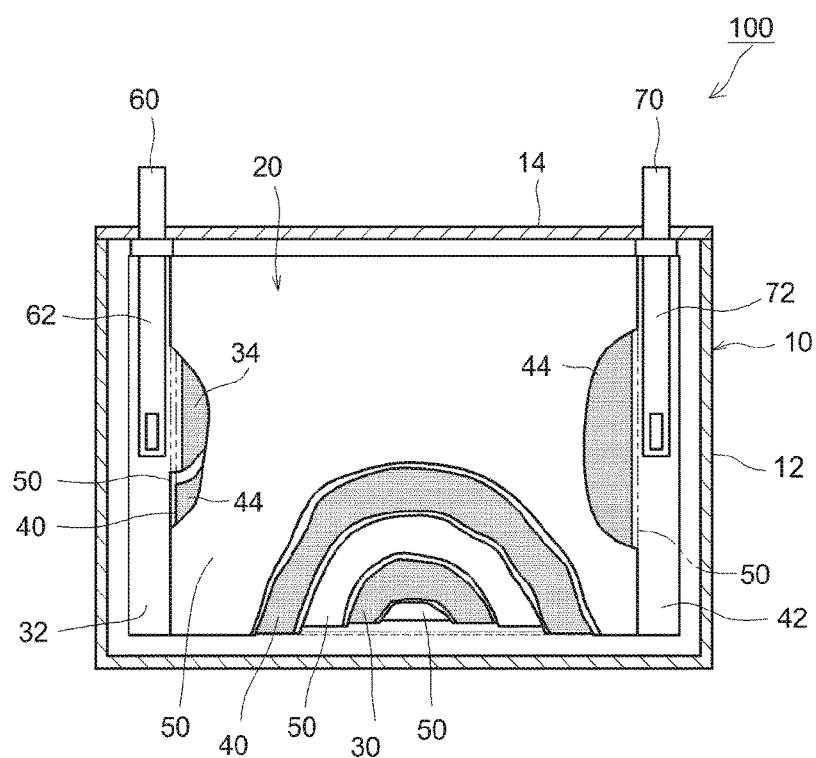
FIG. 1 is a cross-sectional view schematically illustrating the structure of the negative electrode of the nonaqueous electrolyte secondary battery in one embodiment of the present invention.
Figure 2:
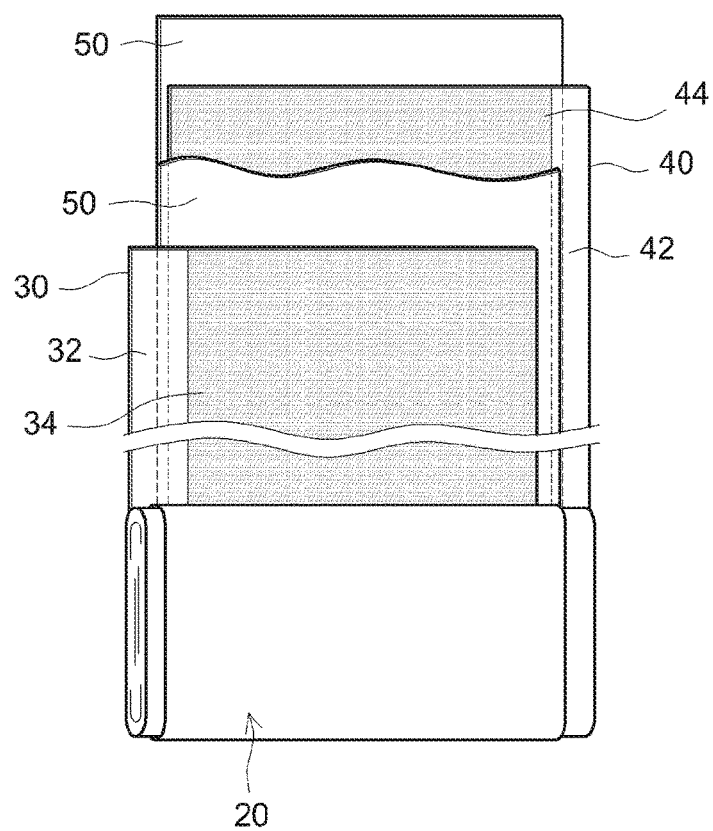
FIG. 2 is a schematic view illustrating the structure of the wound electrode assembly of the nonaqueous electrolyte secondary battery in one embodiment of the present invention.

FIG. 1 is a cross-sectional schematic view explaining the structure of the lithium secondary battery 100 as a typical example of the nonaqueous electrolyte secondary battery disclosed herein. The secondary battery 100 disclosed herein has a basic configuration in which an electrode assembly 20 including a positive electrode 30, a separator 50, and negative electrode 40, and a nonaqueous electrolyte (not shown) are contained in a battery case 10. As shown in FIG. 2, the negative electrode 40 features a negative current collector 42 and a negative electrode active material layer 44 containing a negative electrode active material that is formed on the surface of the current collector.

Furthermore, the nonaqueous electrolyte before being placed or injected into the battery case 10 contains a crown ether in a state wherein no positive charge (or sodium ion) is trapped within the ring. In addition, at the stage wherein the secondary battery 100 has been constructed or completed, the nonaqueous electrolyte contains a crown ether that has formed a complex with a sodium ion. More specifically, the nonaqueous electrolyte is transferred into the battery case 10, and as it infiltrates into the electrode assembly, the crown ether proceeds to trap sodium ions.

The negative electrode 40 comprises a negative current collector 42 and a negative electrode active material layer 44 containing a negative electrode active material formed on the surface of the current collector. This negative electrode 40 does not comprise a coat on the surface of the negative electrode active material layer 44 before it is housed in the battery case 10. When the secondary battery 100 is completed, a coat derived from the oxalato complex component is provided on at least part of the surface of the negative electrode active material layer 44 of this negative electrode 40. More specifically, the oxalato complex compound on the surface of the negative electrode active material layer 44 undergoes reductive decomposition during charge/discharge of the secondary battery 100 (typically, initial charge/discharge), and the coat is formed thereby. With the technology disclosed herein, a homogenous coat with little occurrence of non-uniformity is formed over the entire surface of the negative electrode active material layer 44 in the completed secondary battery 100 through the action of the crown ether in the nonaqueous electrolyte.

Such a nonaqueous electrolyte secondary battery can be preferably manufactured by the method described below but is not necessarily limited to this method. More specifically, the manufacturing method for the nonaqueous electrolyte secondary battery comprises the following steps:

(1) placing an electrode assembly 20 including a positive electrode 30, a separator 50, and a negative electrode 40 in a battery case 10 to configure a battery assembly;

(2) injecting the nonaqueous electrolyte into the battery case 10; and (3) performing an initial charge/discharge treatment on the battery assembly.

It should be understood, however, that these are only the essential steps and do not preclude additional steps at any stage.

1. Construction of the Battery Assembly

First, the electrode assembly 20 is placed in the battery case 10 to construct the battery assembly. In the electrode assembly 20, the positive electrode 30 and the negative electrode 40 are positioned facing each other and insulated by the separator 50.

The positive electrode 30 comprises a positive current collector 32, and a positive electrode active material layer 34 containing at least a positive electrode active material formed on the surface of the positive current collector 32. The fabrication method of the positive electrode 30 is not particularly limited herein. For example, the positive electrode 30 can be fabricated by preparing a composition in the form of a slurry, including pastes and inks (hereinafter, referred to as a "positive slurry"), by mixing a positive electrode active material, a conductor, and a binder, etc., in an appropriate solvent, applying this positive slurry onto the positive current collector 32, and drying to form a positive electrode active material layer 34. Alternatively, the positive electrode active material, conductive material, and binder can be made into a granulated body by granulating to a suitable size, applying this granulated body onto the positive current collector 32, and compressing the same to form the positive electrode active material layer 34. Although not particularly limited herein, a value of approximately 10 mg/cm$^2$ to 30 mg/cm$^2$ can be selected for the mass per surface area of the positive electrode active material layer 34 of the positive current collector 32 (the total mass of both sides in a configuration having a positive electrode active material layer 34 on both sides of the positive current collector 32).

A conductive material comprising a metal with good conductivity (for example, aluminum, nickel, titanium, or stainless steel) can be preferably used as the positive current collector 32. Primarily, a current collector in the form of a foil is preferably used in the wound electrode assembly described below. Although the thickness of the foil current collector is not particularly limited herein, based on a good balance between the specific capacity of the battery and the strength of the current collector, one with a thickness of approximately 5 micrometers to 50 micrometers (more preferably 8 micrometers to 30 micrometers) can be preferably used.

One or two or more substances conventionally used in a nonaqueous electrolyte secondary battery can be used as the positive electrode active material without particular limitation herein. Examples include lithium transition metal oxides such as lithium nickel oxides (e.g., $LiNiO_2$), lithium cobalt oxides (e.g., $LiCoO_2$), lithium manganese oxides (e.g., $LiMn_2O_4$); and lithium transition metal phosphates such as lithium manganese phosphate ($LiMnPO_4$), lithium iron phosphate ($LiFePO_4$), and the like. Among these, a positive electrode active material having a lithium-nickel-cobalt-manganese complex oxide with a layered structure containing elemental lithium, elemental nickel, elemental cobalt, and elemental manganese as constituent elements (e.g., $LiNi_{1/3}Co_{1/3}Mn_{1/3}O_2$) as the main component can be preferably used because it has excellent thermal stability and a high energy density.

The granular form of this kind of positive electrode active material can be suitably used. Although not particularly limited herein, a range of 1 micrometers to 25 micrometers (typically 2 micrometers to 20 micrometers, such as 6 micrometers to 15 micrometers) can be selected as the average particle size of the positive electrode active material. The term "average particle size" used herein represents the particle size ($D_{50}$) equivalent to a cumulative 50% of the particle size distribution of a standard volume measured by a particle size distribution measurement based on conventional laser diffraction and light-scattering methods. The ratio the positive electrode active material with respect to the entire positive electrode active material layer 34 is not particularly limited herein, but preferably is 50 mass % or more (typically a range of 70 mass % to 100 mass %, such as 80 mass % to 99 mass %).

One or two or more substances with binding capability that are conventionally used in a nonaqueous electrolyte secondary battery can be used as the binder without particular limitation herein. For example, when a positive electrode paste is prepared and the positive electrode active material layer is formed, a compound that can dissolve or disperse uniformly in a solvent described below can be used. For example, when forming the positive electrode active material layer using an organic solvent-based paste, a polymer material that will disperse or dissolve in an organic solvent can be preferably used. Examples of such a polymer material include polyvinylidene fluoride (PVdF), polyvinylidene chloride (PVdC), and polyethylene oxide. Alternatively, when the positive electrode active material layer is formed using a water-based paste, a polymer material that dissolves or disperses in water can be preferably used. Examples of such a polymer material include cellulose-based polymers, fluorocarbon polymers, vinyl acetate copolymers, and rubbers. More specific examples include carboxymethyl cellulose (CMC), hydroxypropylmethyl cellulose, polyvinyl alcohols, polytetrafluoroethylene (PTFE), styrene-butadiene rubber (SBR), tetrafluoroethylene-hexafluoropropylene copolymer, and acrylic acid modified SBR resin (SBR-based latex). For example, although not particularly limited herein, a range of 0.5 mass % to 10 mass % (preferably 1 mass % to 5 mass %) can be selected for the ratio of binder with respect to the entire positive electrode active material layer.

One or two or more substances conventionally used in a nonaqueous electrolyte secondary battery can be used as the conductive material without particular limitation herein. For example, a carbon material such as carbon black (e.g., acetylene black, furnace black, Ketjen black, and the like), coke, graphite (natural graphite and modified forms thereof, artificial graphite) and the like can be used. Among these, carbon black with a small particle size and large specific surface area (typically, acetylene black) can be preferably used. For example, although not particularly limited herein, a range of 1 mass % to 15 mass % (typically 5 mass % to 10 mass %) can be selected for the ratio of conductive material with respect to the entire positive electrode active material layer.

As noted above, the solvents used for the fabrication of the positive electrode 30 can be divided into aqueous solvents and organic solvents (nonaqueous solvents). Specific examples of organic solvents include N-methyl-2-pyrrolidone (NMP), N,N-dimethyl acetamide, 2-propanol, cyclohexanone, methyl acetic acid, ethyl acetic acid, methyl acrylic acid, and the like. Water or a mixed solvent with water as the primary component thereof is preferred as an aqueous solvent. One or two or more types of organic solvent (lower alcohols, lower ketones, etc., with 5 or fewer carbon atoms) that can mix homogenously with water can be suitably selected and used as a solvent that forms a mixed solvent other than water. For example, the use of an aqueous solvent that is approximately 80 mass % or more water (more preferably approximately 90 mass % or more, and even more preferably 95 mass % or more) is preferred. An aqueous solvent (water, for example) that substantially contains water is particularly preferred.

Moreover, various additives such as dispersing agents and thickening agents can be added to the positive electrode slurry that is prepared provided the effect of the present invention is not greatly diminished. Examples of the dispersing agent include polymer compounds with a hydrophobic chain and a hydrophilic group (such as an alkali salt, typically a sodium salt), as well as anionic compounds containing a sulfate, sulfonate, phosphate, and the like, and cationic compounds such as amines and the like. More concrete examples include carboxymethyl cellulose (CMC), methylcellulose, ethyl cellulose, hydroxypropyl cellulose, butyral, polyvinyl alcohols, modified polyvinyl alcohols, polyethylene oxide, polyvinyl pyrrolidone, polycarboxylic acids, starch oxide, starch phosphate, and the like.

In the manufacturing method disclosed herein, the solvent contained in the paste (or granulated body) is removed by a suitable drying means, for example, after the positive electrode paste or granulated body is applied to the positive current collector. Natural drying, or drying by hot air flow, low humidity air flow, vacuum, infrared radiation, far infrared radiation, electron radiation, and the like either alone or in combination can be used. After drying, the thickness and density of the positive electrode active material layer can be adjusted by performing a suitable compression treatment on the positive electrode. Examples of a compression treatment include various compression methods that have been publicly known such as roll pressing, flat pressing, and the like.

If the density of the positive electrode active material layer formed on the positive current collector is extremely low, there is concern that the energy density per unit volume will decrease. On the other hand, if the density of the positive electrode active material layer is extremely high, the internal resistance, especially during high current charge/discharge and under low temperature conditions, will tend to increase. Therefore, preferably a value of 2.0 $g/cm^3$ or higher (typically 2.5 $g/cm^3$ or higher), but 4.5 $g/cm^3$ or lower (typically 4.2 $g/cm^3$ or lower) will be selected for the density of the positive electrode active material layer.

The negative electrode 40 comprises a negative current collector 42 and a negative electrode active material layer 44 containing at least a negative electrode active material formed on the surface of the negative current collector 42. The method of fabricating the negative electrode 40 is not particularly limited herein. For example, a process similar to the one used above for the positive electrode 30 can be suitably used. A range of approximately 5 $mg/cm^2$ to 30 $mg/cm^2$, for example, can be selected for the mass (total mass of both sides) of the negative electrode active material layer 44 per unit area of the negative current collector 42.

A conductive material comprising a metal with good conductivity (for example, copper, nickel, titanium, or stainless steel) can be preferably used as the negative current collector. The shape of the negative current collector can be the same as the shape of the positive current collector.

As the negative electrode active material, one or two or more types of the materials conventionally used in secondary batteries can be used without particular limitation. Examples include natural graphite and modified forms thereof as well as artificial forms of graphite produced from petroleum or graphite-based materials; low crystalline carbon materials having at least a partial graphite structure (lamellar structure) such as hard carbon (hardly graphitized carbon), soft carbon (easily graphitized carbon), carbon nanotubes and the like; metal oxides such as a lithium titanium compound oxide and the like; and alloys of lithium with tin (Sn) and silicon (Si). Among these, a graphitic carbon material offering high energy density (typically, graphite) can be preferably used. Although not particularly limited herein, normally the ratio of negative electrode active material with respect to the entire negative electrode active material layer is approximately 50 mass % or higher, and approximately 90 mass % to 99 mass % (e.g., 95 mass % to 99 mass %) is preferred.

As the binder, a suitable material from among the polymer materials exemplified as the binder for the positive electrode active material layer can be selected. Examples include styrene-butadiene rubber (SBR), polyvinylidene fluoride (PVdF), and polytetrafluoroethylene (PTFE). The ratio of binder with respect to the entire negative electrode active material layer can be suitably selected depending on the type and amount of the negative electrode active material and, for example, a range of 1 mass % to 10 mass % (preferably 2 mass % to 5 mass %) can be selected. Other various additives and conductive materials already noted above can also be suitably used.

After the negative electrode paste has been applied, the solvent is removed using a suitable drying process noted above. After drying, the thickness and density of the negative electrode active material layer can be adjusted in the same manner as that of the positive electrode by using a suitable compression treatment. For the density of the negative electrode active material layer after the compression treatment, for example, a range between 1.1 g/cm$^3$ (typically 1.2 g/cm$^3$, e.g., 1.3 g/cm$^3$) and 1.5 g/cm$^3$ (typically 1.49 g/cm$^3$) can be selected.

Various types of microporous sheets such as those used in a conventional secondary battery can be used for the separator 50, and examples include microporous resins sheets comprising resins such as polyethylene (PE), polypropylene (PP), polyesters, celluloses, and polyamides. Such a microporous resin sheet can have a monolayer structure, or a multilayer structure of two or more layers (for example, a tri-layer structure with PP layers laminated on both sides of a PE layer). The separator can feature a heat-resistant layer (HRL) containing particles of an inorganic compound (inorganic filler) on one or both sides of the above microporous resin sheet. Alumina, boehmite, magnesia, and the like can be used as the inorganic filler.

Figure 6:
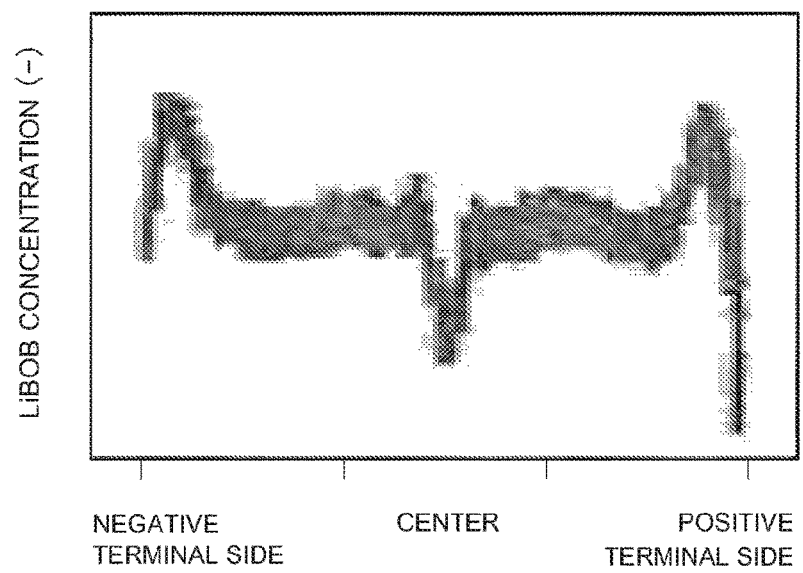
FIG. 6 is a chart illustrating the LiBOB concentration distribution in the direction of nonaqueous electrolyte infiltration in the negative electrode of a conventional nonaqueous electrolyte secondary battery.

The electrode assembly 20 can be fabricated by laminating the positive electrode 30 and the negative electrode 40 with the separator 50 interposed therebetween. Although the configuration of the electrode assembly is not particularly limited herein, preferably it has a layered structure obtained by repetitions of opposing positive and negative electrodes with a separator interposed therebetween. Both a flat, layered electrode assembly, wherein multiple sheets of positive electrode, negative electrode, and separator are layered, or a wound electrode assembly (see FIG. 2), wherein an elongate positive electrode, negative electrode, and separator are layered, are feasible for an electrode assembly having such a layered structure. Because such an electrode assembly with a layered structure is configured so that the surface area of the electrode will be large, high energy density can be realized and high capacity becomes possible thereby. In a wound electrode assembly the infiltration of the nonaqueous electrolyte only occurs from both edges in the direction of the winding axis. As a result, in the past, non-uniformity of the infiltration of the nonaqueous electrolyte has easily occurred in the direction of the wound axis (in other words, the widthwise direction of the elongate electrode) in a wound electrode assembly (see FIG. 6). A configuration featuring a wound electrode assembly can also be a preferred mode in the secondary battery 100 disclosed herein because this non-uniformity of the infiltration of the nonaqueous electrolyte can be prevented.

Materials and shapes conventionally used in a nonaqueous electrolyte secondary battery can be used for the battery case 10. Examples of case materials include a relatively lightweight metal such as aluminum or steel, and resin materials such as polyphenylene sulfide resins, and polyimide resins. Among these, a battery case 10 made of a relatively lightweight metal (for example, aluminum or an aluminum alloy) can be preferably used because heat dissipation and energy density can be increased. Moreover, the shape of the case 10 is not particularly limited herein, and can be round (cylindrical, coin-shaped, button-shaped) or hexahedral (rectangular, flat), as well as such a shape modified by processing.

The battery case 10 shown in FIG. 1 comprises a flattened rectangular case body 12 with an open upper end, and a sealing member 14 for closing the opening. A positive terminal 60 that is electrically connected to the positive electrode 30 of the wound electrode assembly 20 and a negative terminal 70 that is electrically connected to the negative electrode 40 of the electrode assembly 20 are provided at top (i.e., the sealing member 12) of the battery case 10. For example, a positive current collector plate 62 is provided on the exposed end of the positive current collector 32 of the electrode assembly 20, and a negative current collector plate 72 is provided on the exposed end of the negative current collector 42, and each is electrically connected to its corresponding positive terminal 60 and negative terminal 70. A safety mechanism such as a current cutoff mechanism (a mechanism that can cut off the current in response to an increase in internal pressure during overcharging of the battery) can be provided as needed on the conductive pathway between the electrode assembly 20 and the positive terminal 60 and negative terminal 70 in the battery case 10. Moreover, just as for a battery case 10 of a conventional secondary battery, the sealing member 14 is provided with a safety valve (not shown) to discharge gas that has been generated within the battery case to the outside.

When a metal battery case 10 is used, a welding process such as laser welding, resistance welding, electron beam welding, and the like can be used for the operation of sealing (closing) the battery case 10. When a non-metal (e.g., resin) battery case 10 is used, a means such as bonding with an adhesive or ultrasonic welding can be used. Thus, the battery assembly can be constructed in this manner.

2. Injection of Nonaqueous Electrolyte

Next the nonaqueous electrolyte is injected into the battery case 10 of the battery assembly. This nonaqueous electrolyte contains an electrolyte, a solvent to dissolve the electrolyte, an oxalato complex compound as a coat-forming agent, and a crown ether as a sodium-trapping agent. When the nonaqueous electrolyte is added to the battery case 10, it infiltrates the electrode assembly 20 (specifically, the spaces between the active material of the negative electrode and the separator). Moreover, sodium ions that are inevitably contained in the electrode assembly 20 leach out into the nonaqueous electrolyte. Due to this nonaqueous electrolyte composition, the crown ether acts as a sodium trapping agent, and it rapidly and selectively captures (traps) sodium ions that have leached out of the electrode assembly 20. Therefore, the oxalato complex compound, which has a slow infiltration rate, captures (consumes) the sodium ions before reacting with them, and this prevents the formation of an insoluble sodium salt of the oxalato complex compound (e.g., NaBOB).

Therefore, in accordance with this nonaqueous electrolyte, the formation of an insoluble sodium salt can be prevented in an negative electrode active material layer 44 wherein infiltration by the oxalato complex compound is particularly difficult. In particular, formation of an insoluble sodium salt is prevented at both edges in the widthwise direction of the negative electrode active material layer 44, which are the sites where the infiltration occurs earliest. In other words, the obstruction of infiltration of the nonaqueous electrolyte by an insoluble sodium salt is prevented. As a result, the oxalato complex compound can be distributed more homogenously and uniformly in the electrode assembly 20 in the widthwise direction of the negative electrode active material layer 44.

An aprotic medium such as a carbonate, ester, ether, nitrile, sulfone, lactone, and the like can be used as the solvent. Among these, a carbonate such as ethylene carbonate (EC), diethyl carbonate (DEC), dimethyl carbonate (DMC), ethyl methyl carbonate (EMC), and the like can be suitably used.

Various materials that are known to be capable of functioning as a supporting electrolyte in a secondary battery can be used as the supporting electrolyte. Examples include one type alone or two or more types selected from various lithium salts such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, and LiClO$_4$. Among these the use of LiPF$_6$ is preferred. The concentration of the supporting electrolyte is not particularly limited herein, but if it is extremely low, the amount of lithium ions contained in the electrolyte will be insufficient and ion conductivity will tend to decrease. On the other hand, if the concentration is extremely high, the viscosity of the electrolyte will be too high, and conductivity will tend to decrease. Therefore, the supporting electrolyte can be contained at a concentration with respect to the entire electrolyte of approximately 0.1 mol/L to 2 mol/L (preferably, approximately 0.8 mol/L to 1.5 mol/L).

An oxalato complex compound prepared by a publicly known method or one that is a readily available commercial product can be used without limitation herein, either alone or as a combination of two or more types. A type of salt or a conductive form of an oxalato complex are also feasible for such a compound. An oxalato complex is an ionic complex formed by the coordination bonding of at least one oxalate ion (C$_2$O$_4^{2-}$) with a central element (also called a coordination atom). The central element is not particularly limited herein provided it is an element that can form the ionic oxalato complex, and examples include metalloid elements represented by boron (B), phosphorus (P), and the like; halogen elements represented by fluorine (F), and the like; precious metal elements represented by platinum (Pt), and the like; and transition metal elements represented by cobalt(III), iron(III), and the like.

A preferred oxalato complex compound that can form a good coat has a structure wherein the oxalate ion is coordinated as a ligand with boron (B) or phosphorus (P) as the central element.

Examples with boron (B) as the central element, i.e., oxalato borate complex compounds, typically are the kinds of compounds represented by Formula (I) or Formula (II) below.

[Chem.1]

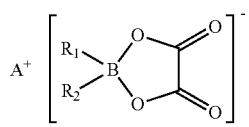

(I)

[Chem.2]

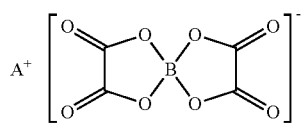

(II)

Here R$_1$ and R$_2$ in Formula (I) can independently be selected from a halogen atom (e.g., F, Cl, or Br, preferably F) and a perfluoroalkyl group of 1 to 10 (preferably 1 to 3) carbon atoms. Moreover, A$^+$ in Formulas (I) and (II) can be either an inorganic cation or an organic cation. Concrete examples of inorganic cations include cations of alkali metals such as Li, Na, or K; cations of alkaline earth metals such as Be, Mg, or Ca; and cations of other metals such as Ag, Zn, Cu, Co, Fe, Ni, Mn, Ti, Pb, Cr, V, Ru, Y, lanthanoides, and actinoides; and protons. Concrete examples of organic cations include tetra-alkyl ammonium ions such as the tetrabutyl ammonium ion, tetraethyl ammonium ion, and tetramethyl ammonium ion; tri-alkyl ammonium ions such as the triethylmethyl ammonium ion and triethyl ammonium ion; and also the pyridinium ion, imidazolium ion, tetraethyl phosphonium ion, tetramethyl phosphonium ion, tetraphenyl phosphonium ion, triphenyl sulfonium ion, and triethyl sulfonium ion. Examples of preferred cations include the lithium ion, tetralkyl ammonium ion, and proton.

Examples with phosphorus (P) as the central element, i.e., oxalato phosphate complex compounds, typically are the kinds of compounds represented by Formula (III) or Formula (IV) below. Specific examples include lithium difluorobis(oxalato)phosphate, lithium tris(oxalato)phosphate, tetrafluoro(oxalato)phosphate, and the like.

[Chem.3]

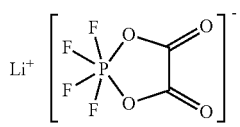

(III)

[Chem.4]

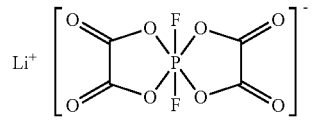

(IV)

The examples show a lithium ion as the cation, but just as in the case of A$^+$ in Formulas (I) and (II), another cation can also be used in Formulas (III) and (IV). Moreover, just as in the case of R$_1$ and R$_2$ in Formula (II), F in Formulas (III) and (IV) can independently be selected from F and other halogen atoms (e.g., F, Cl or Br, preferably F) and a perfluoro alkyl group of 1 to 10 (preferably 1 to 3) carbon atoms.

In one preferred mode disclosed herein, a compound represented by Formula (I) such as lithium bis(oxalato) borate, lithium difluoro(oxalato)borate, or represented by Formula (IV) such as lithium difluorobis(oxalato)phosphate can be used as the oxalato complex compound. Among these, the lithium bis(oxalato)borate (LiBOB) represented by Formula (II) can be noted as a preferred example. The oxalato complex compound can form a coat derived from the oxalato complex component on the surface of the negative electrode active material layer (negative electrode active material) by undergoing reductive decomposition during the initial charge/discharge treatment described below. When the oxalato complex compound is an oxalato borate complex compound or oxalato phosphate complex compound, the coat has more excellent stability by containing a boron atom (B) or phosphorus atom (P). Therefore, the nonaqueous electrolyte decomposition reaction and degradation of the negative electrode active material that accompany the charge/discharge treatment that follows can be suitably prevented. Among these, the bis(oxalato)borate anion ([B(C$_2$O$_4$)$_2$]$^-$) produced by the dissociation of lithium from LiBOB has a lower dispersion rate than the sodium component contained in the negative electrode, and it can combine with this sodium component to form insoluble sodium bis(oxalato)borate (NaBOB). The technology disclosed herein is particularly preferred for use with LiBOB as the oxalato complex compound because the problems caused by the segregation of NaBOB can be solved.

The concentration of the oxalato complex compound in the nonaqueous electrolyte used in the configuration of the battery disclosed herein is not particularly limited provided it is a concentration wherein the compound can stably dissolve in the temperature range of normal battery use (e.g., −30 degrees centigrade to 60 degrees centigrade) because the addition of just a small amount thereof contributes to coat forming. Preferably, the concentration of the oxalato complex compound is approximately 0.001 mol/L or greater (typically, 0.005 mol/L or greater, e.g., 0.01 mol/L or greater). Adding more than necessary is undesirable because it increases the viscosity of the nonaqueous electrolyte, which increases the resistance. From this aspect, a value of 0.2 mol/L or less (typically, 0.1 mol/L or less, such as 0.07 mol/L or less) can be selected for the concentration of the oxalato complex compound. A concentration may be 0.05±0.005 mol/L. The symbol "±" refers to Plus-minus sign as mathematical symbols.

Various macrocyclic polyethers represented by the general formula $(CH_2CH_2O)_n$ (wherein n is an integer of 4 or greater) and derivatives thereof can be used for the crown ether. A crown ether having a basic structure represented by the above general formula and comprising only carbon atoms (C), oxygen atoms (O) and hydrogen atoms (H) is also referred to herein as an N-crown-M-ether where N represents the total number of atoms constituting the ring and M represents the number of oxygen atoms. Representative examples of crown ethers with this basic structure include 12-crown-4-ether; the 15-crown-5-ether as shown in Formula (V) below; 18-crown-6-ether as shown in Formula (VI), and the like. Moreover, derivatives prepared by various modifications of a crown ether with such a basic structure (meaning that derivatives and analogs are also included) are also feasible. Examples include a thiacrown ether and an azacrown ether in which an oxygen atom (O) is replaced by a sulfur atom (S), an NH group, and the like in the crown ether having a basic structure. Specific examples are the 4,10-diaza-15-crown-5-ether represented by Formula (VII) below wherein two oxygen atoms in the 15-crown-5-ether are replaced with NH, and the diaza-18-crown-6-ether represented by Formula (VIII) wherein two oxygen atoms in the 18-crown-6-ether are replaced with NH. Other examples include the 15-crown-5-ether derivative dibenzo-15-crown-5-ether represented by Formula (IX) below, and the 18-crown-6-ether derivative dibenzo-18-crown-6-ether represented by Formula (X).

This crown ether can be a monocyclic coronand, or it can also be a polycyclic cryptand formed of two or more linked cyclic polyethers. All compounds having such a cyclic polyether structure are included in the concept of crown ether as used in the present invention.

[Chem. 5]

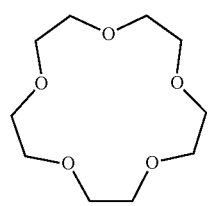

(V)

[Chem. 6]

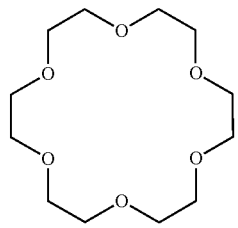

(VI)

[Chem. 7]

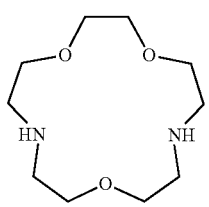

(VII)

[Chem. 8]

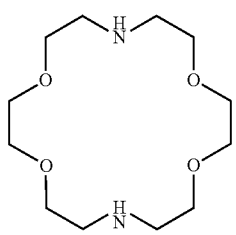

(VIII)

[Chem. 9]

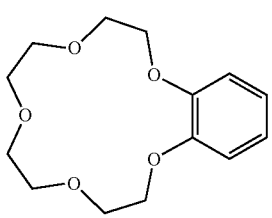

(IX)

[Chem. 10]

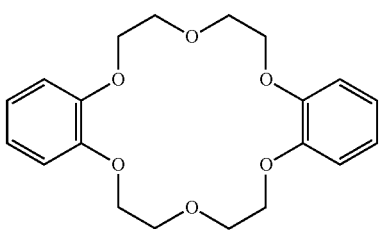

(X)

It is easy to incorporate a cation (a positively charged ion) in the above cyclic ethers because there are unshared electron pairs in the oxygen atoms within the ring. The mode of ion incorporation is not particularly limited herein, and one retaining a single cation in the vacancy of a single crown ether ring, one retaining two or more cations in the vacancy of a single crown ether ring, and even one sandwiching a cation in the vacancy between two or more crown ether rings are feasible. Therefore, a cation of a specific size in relation to the size of the ring can be trapped to form a complex by adjusting the size of the ring. In other words, it is possible to make a cation of a specific size into a solvate. The stability of the complex is thought to depend on the arrangement of the unshared electron pairs, the ionic diameter of the cation, the relative size of the diameter of the vacancy in the ring, and the like.

From this viewpoint, although the crown ether is not necessarily limited herein, a preferred crown ether is formed of a ring structure having only carbon-carbon bonds or ether bonds between the carbon atoms and the oxygen atoms such that there is little asymmetry in the unshared electron pairs (in other words, the oxygen atoms are evenly arranged in the ring that traps the cation). In addition, an even more preferred crown ether is formed only of carbon atoms, oxygen atoms, and hydrogen atoms, and the so-called basic structure is represented by the general formula $(CH_2CH_2O)_n$ shown above. From the viewpoint of capability to incorporate a sodium ion and form a stable complex, a preferred crown ether is formed of a ring of 15 to 18 members. In consideration of these matters, the use of a 15-crown-5-ether and/or 18-crown-6-ether as the crown ether is typically preferred. The use of a 15-crown-5-ether, either alone or in combination with another crown ether, is especially preferred.

Various modifications can be used to alter the selectivity of the above cyclic ether toward the ion to be incorporated therein. For example, a spherand exhibiting strong selectivity for sodium ions can be used as the crown ether.

The crown ether contained in the nonaqueous electrolyte can exhibit a sodium trapping effect even in extremely small amounts disclosed herein. Therefore, when the amount (e.g., number of moles) of crown ether contained in the nonaqueous electrolyte is assigned a value of A, the relationship $0<A$ is satisfactory. This condition is preferred because as the amount of crown ether increases, the quantity of trappable sodium ions also increases. However, if the amount of crown ether excessively increases, problems can arise such as an increase in the viscosity of the nonaqueous electrolyte, hindrance of infiltration, and increase in resistance. From this viewpoint, the amount of the crown ether can be suitably adjusted to enable satisfactory trapping of the sodium ions depending on the amount of sodium ions that leach into the nonaqueous electrolyte from the electrode assembly 20. For example, when the amount of sodium ions (number of moles) that leach into the nonaqueous electrolyte from the electrode assembly 20 is assigned a value of X, it is preferable to adjust the ratio A/X appropriately. Although this A/X value cannot be stated unconditionally because it depends on the structure of the crown ether and composition of the nonaqueous electrolyte, a value of $0<A/X$ is satisfactory, $0.1 \leq A/X$ is preferred, $0.2 \leq A/X$ is more preferred, and $0.4 \leq A/X$ is even more preferred, so a value such as $0.5 \leq A/X$ can be selected. Moreover, the upper limit of A/X can be adjusted depending on desired characteristics such as the reaction resistance of the secondary battery to be manufactured and, for example, a value of $A/X \leq 2.5$ is satisfactory, $A/X \leq 2$ is preferred, $A/X \leq 1.5$ is more preferred, and $A/X \leq 1.4$ is even more preferred, so a value such as $A/X \leq 1.2$ can be selected. Selection of a value in the range of $0.5 \leq A/X \leq 1.2$ is typically preferred.

The amount of the nonaqueous electrolyte contained in the battery case can change depending on the construction of the secondary battery (for example, design matters such as the shape of the battery case and the volume of the voids in the case). Therefore, if the amount of the crown ether is understood to be the concentration of crown ether contained in the nonaqueous electrolyte, when the concentration of crown ether is assigned a value of C (mol/L) and the amount of the nonaqueous electrolyte contained in the secondary battery is assigned a value of Z (L), the concentration of crown ether C can be determined such that it satisfies the relationship $A=C*Z$. Moreover, the value of "$C*Z/X$" can be determined in the same manner as that for the value of A/X.

Moreover, the nonaqueous electrolyte can also contain various additives in a range such that does not adversely affect the characteristics of the present invention. For example, various additives such as a coat-forming agent like vinylene carbonate (VC) or fluoroethylene carbonate (FCE), or a gas-generating additive such as biphenyl (BP) or cyclohexyl benzene (CHB) can be added as appropriate.

The battery assembly with the nonaqueous electrolyte injected in this manner can be let stand so that the nonaqueous electrolyte will sufficiently infiltrate the electrode assembly 20.

3. Initial Charge/Discharge Treatment

An initial charge/discharge treatment is carried out on the battery assembly by charging the nonaqueous electrolyte to a predetermined charge voltage and then discharging. As a result, the oxalato complex component distributed in the negative electrode 40 (specifically, the negative electrode active material layer 44) undergoes reductive decomposition and can form a polymeric coat derived from the oxalato complex component on the surface of the negative electrode 40. It should be understood that in the technology disclosed herein, by the crown ether being contained in the nonaqueous electrolyte, the oxalato complex compound is distributed homogenously in a state wherein non-uniformity is more suppressed (preferably absent) in the negative electrode 40 (specifically the negative electrode active material layer 44) before the initial charge/discharge treatment. Therefore, the polymeric coat derived from the oxalato complex component is formed homogenously in a state wherein non-uniformity is suppressed (preferably absent) across the entire surface of the negative electrode 40. This prevents non-uniformity of the current that flows through the negative electrode active material layer 44 after charge/discharge. Therefore, problems such as local deterioration of the negative electrode active material are prevented, and a secondary battery that can satisfactorily realize cycling characteristics and other various battery properties over a long extent of time can be provided.

Conditions of conventional initial charge/discharge treatments can be used for the initial charge/discharge treatment conditions provided that charge/discharge is performed in a voltage range that enables reductive decomposition of the oxalato complex compound. Although not particularly limited herein, a value can be selected that is 3.5 V or more (such as 4.0 V or more), for example, a value of 4.9 V or less (such as 4.7 V or less). Moreover, the rate during charge/discharge is not particularly limited herein, but selection of a range between 0.1 C and 5 C, typically 0.2 C to 1 C, can serve as an example. In addition, the charge/discharge treatment is not limited to a single time and can be repeated multiple times.

4. Other Modes

In the above embodiment, the nonaqueous electrolyte before being injected into the battery case 10 simultaneously contains the oxalato complex compound as a coat-forming agent and a crown ether as a sodium-trapping agent. However, the essence of the present invention in that the sodium ions are trapped by the crown ether before the reaction between the oxalato complex compound and the sodium ion occurs is not particularly limited to the above configurations of nonaqueous electrolyte and manufacturing method.

In other words, the nonaqueous electrolyte before being injected into the battery case 10 may have a configuration in which the nonaqueous electrolyte is divided into a first nonaqueous electrolyte containing a crown ether and a second nonaqueous electrolyte containing an oxalato complex compound (two electrolyte configuration). Then in the step of injection of the nonaqueous electrolyte, the first nonaqueous electrolyte can be injected first, and the second nonaqueous electrolyte can be injected later. Such a configuration enables more reliable early trapping of the sodium ions that leach out from the electrode assembly 20 by the crown ether contained in the first nonaqueous electrolyte, followed by infiltration by the oxalato complex compound into the electrode assembly. The nonaqueous electrolyte and manufacturing method of such a mode can be applied with particular suitability, for example, when a compound of which infiltration rate into the negative electrode active material layer 44 is not so slow is used as the oxalato complex compound. The ratio of the first nonaqueous electrolyte to the second nonaqueous electrolyte can be suitably adjusted to a range with a volume ratio of 1:99 to 99:1, and preferably 50:50 to 99:1. Moreover, the electrolyte material, oxalato complex compound, and crown ether can be contained in the nonaqueous electrolyte of a two-electrolyte configuration such that the quantities in the above range are achieved by the mixed state of the first nonaqueous electrolyte and the second nonaqueous electrolyte.

The value of X, the amount of sodium ions that are leached from the electrode assembly 20 into the nonaqueous electrolyte, can be determined as follows. Specifically, a test piece of a predetermined size is cut from the electrode assembly 20 having a target configuration, and immersed in a predetermined amount of nonaqueous electrolyte. Then the concentration of sodium ions (which can also be the increase in sodium ions) that have leached into the nonaqueous electrolyte is measured. Thereby it is possible to verify the quantity of sodium ions that leach into the nonaqueous electrolyte from the target electrode assembly 20. In concrete terms, quantity X, the amount of sodium ions that are leached into the nonaqueous electrolyte from the electrode assembly 20, can be investigated based on the examples discussed below. The amount of leached sodium ions can be measured once when manufacturing a secondary battery of a fixed configuration, and there is no need to measure every secondary battery of the same configuration during manufacturing.

Various structural analysis methods can be used to determine whether the coat formed on the negative electrode active material is derived from the oxalato complex component. Although not particularly limited herein, a preferred example is the use of TOF-SIMS (time-of-flight secondary ion mass spectrometry). According to this analytical method, information on the elemental composition and chemical structure of the outermost surface of the negative electrode can be obtained, and the origin of the components comprising the coat can be thereby determined. Another method can be used to determine whether the central atom such as boron (B) or phosphorus (P) in the oxalato complex compound is included among the elements constituting the coat. More specifically, whether the central atom originated in the oxalato complex component can be confirmed by predicting whether the bonding state of the central element in the coat is due to reduction polymerization of the oxalato complex compound. Although not particularly limited herein, examples of methods that can be used to analyze the elements constituting the coat and their bonding state include solid high-resolution nuclear magnetic resonance (NMR), x-ray photoelectron spectroscopy (XPS), and x-ray absorption fine structure (XAFS).

In addition, the oxalato complex compound that is added to the battery case as a coat-forming agent either remains as an oxalato complex compound (which can also be oxalato complex ion) in the nonaqueous electrolyte without undergoing reductive decomposition, or forms a coat derived from the reductively decomposed oxalato complex compound (oxalato complex component). The total amount of the oxalato complex compound and its decomposition product measured in oxalato complex units can be conserved before and after initial charge/discharge. Therefore, the amount of oxalato complex compound that is added in the battery case can be checked by measuring the amount of that compound in the nonaqueous electrolyte and the total amount of the component (decomposition product) in the coat having a common origin with the oxalato complex compound. Hence, even in a finished secondary battery (post-initial charge/discharge) the use of the nonaqueous electrolyte disclosed herein can be confirmed. The preferred oxalato complex unit can be the ratio of 0.001 to 0.1 mol/L expressed as a value in relation to 1 L of nonaqueous electrolyte because it is conserved both before and after charge/discharge. This can be confirmed by quantitation of components derived from the oxalato complex (e.g., the central element) in the nonaqueous electrolyte and on the surfaces of the positive and negative electrodes (typically the coat on the surface of the negative electrode). Examples of methods that can be used to determine this quantity include ion chromatography, high-frequency inductive coupling plasma (ICP) emission analysis, atomic absorption spectrophotometry, and the like. Although not particularly limited herein, the measurement of the concentration of the central element in the oxalato complex compound can be carried out specifically using the procedure described below. For example, the central element such as boron (B) or phosphorus (P) in a test sample for measurement can be measured by disassembling a secondary battery, cutting the positive and negative electrodes extracted from the disassembled secondary battery to predetermined sizes, heating and dissolving the active material layer of the electrodes in sulfuric acid, and analyzing the solution by inductively coupled plasma-atomic emission spectroscopy (ICP-AES).

The nonaqueous electrolyte secondary battery (typically a lithium secondary battery) 100 disclosed herein can realize excellent cycling characteristics and other battery performance as described above through the advantageous effect of adding both a oxalato complex compound and a crown ether to the nonaqueous electrolyte. Therefore, the battery can be preferably used in a variety of practical applications, and it can be used most suitably, for example, as a power source for a vehicle drive motor (power source for the drive) that is mounted in various types of vehicles. Although the type of vehicle is not particularly limited herein, typical examples include a plug-in hybrid vehicle (PHV), hybrid vehicle (HV), and electric vehicle (EV). The nonaqueous electrolyte secondary battery 100 can be used alone, or it can be used in form of a battery pack comprising a plurality of batteries connected in series and/or parallel.

Several embodiments relevant to the present invention are described below, but the present invention is by no means limited to the items shown in these embodiments.

Behavior of the Crown Ether in the Nonaqueous Electrolyte

Example A

Figure 3:
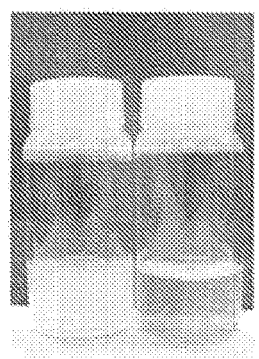
FIG. 3 is a perspective drawing illustrating the effect of the crown ether in the nonaqueous electrolyte of one embodiment.

A nonaqueous electrolyte of the following composition was prepared in a vial container. More specifically, a mixed solvent containing ethylene carbonate (EC), ethyl methyl carbonate (EMC) and dimethyl carbonate (DMC) in a volumetric ratio of EC:EMC:DMC=1:1:1 was prepared. $LiPF_6$ was used as the supporting electrolyte (electrolyte) and this was dissolved in the above solvent at a concentration of 1 mol/L. Moreover, LiBOB was used as the coat-forming agent and was dissolved in the above solvent at a concentration of 0.05 mol/L. This served as the nonaqueous electrolyte for Example A. In addition, $NaPF_6$, which simulates the sodium that will leach into the nonaqueous electrolyte, was additionally dissolved in the nonaqueous electrolyte of Example A at a concentration of 0.05 mol/L. As the nonaqueous electrolyte of Example A was observed, a white precipitate of NaBOB appeared simultaneously when the $NaPF_6$ was dissolved. The appearance is shown in FIG. 3 (Example A).

Example B

The same nonaqueous electrolyte as in Example A was prepared in a small bottle. Then 15-crown-5-ether as the crown ether to act as the sodium trap was dissolved in the prepared nonaqueous electrolyte at a concentration of 0.05 mol/L. This served as the nonaqueous electrolyte for Example B. Then $NaPF_6$, which simulates the sodium that will leach into the nonaqueous electrolyte, was additionally dissolved in the nonaqueous electrolyte of Example B at a concentration of 0.05 mol/L.

By observing the nonaqueous electrolyte of Example B, it was confirmed that the nonaqueous electrolyte remains transparent even after several hours have elapsed. The appearance is shown in FIG. 3 (Example B).

Based on the above, it is clear that when sodium ions leach into the nonaqueous electrolyte, the sodium ions react with the LiBOB as a coat-forming agent and form an insoluble oxalato complex salt. Furthermore, it was confirmed that by including a crown ether in the nonaqueous electrolyte beforehand as a sodium trap, the sodium ions that leach into the nonaqueous electrolyte can be selectively and rapidly captured and formation of the insoluble oxalato complex salt can be prevented.

<Fabrication of Non-Aqueous Electrolyte Secondary Battery>

First $LiNi_{1/3}Co_{1/3}Mn_{1/3}O_2$ (NCM) as the positive electrode active material powder, acetylene black (AB) as the conductive material, and polyvinylidene fluoride (PVdF) as the binder were weighed out so that the mass ratio of these materials would be NCM:AB:PVdF=93:4:3, and then kneading was performed while adjusting the viscosity with N-methyl pyrrolidone (NMP) to prepare a composition for forming the positive electrode active material layer. This composition was applied to a 15 micrometers thick elongate aluminum foil (positive current collector), dried, and then compressed to fabricate a positive electrode with the positive electrode active material layer on the positive current collector. This positive electrode was cut out and used as the positive electrode with a positive electrode active material layer of predetermined dimensions.

Next, natural graphite (C) as the negative electrode active material, styrene-butadiene rubber (SBR) as the binder, and carboxymethylcellulose (CMC) were weighed out so that the mass ratio of these materials would be C:SBR:CMC=98:1:1, and then kneading was performed while adjusting the viscosity with deionized water to prepare a composition for forming the negative electrode active material layer. This composition was applied to a 10 micrometers thick elongate copper foil (negative current collector), dried, and then compressed to fabricate a negative electrode with the negative electrode active material layer on the negative current collector. This negative electrode was cut out and used as the negative electrode with a negative electrode active material layer of predetermined dimensions.

The positive and negative electrodes fabricated above were positioned opposing each other, interposed with an elongate separator (polyethylene), and then wound with the widthwise direction orthogonal to the lengthwise direction as the winding axis. Next, the wound electrode assembly was formed into a flattened shape by compression in a direction orthogonal to the winding axis to form a flattened wound electrode assembly for evaluation.

Then the positive and negative terminals formed in the sealing member of the battery case were connected by welding to their respective edges of the positive current collector and negative current collector of the electrode assembly. The electrode assembly was placed in a flattened prismatic battery case and the nonaqueous electrolyte was injected. The nonaqueous electrolyte was prepared by dissolving $LiPF_6$ at a concentration of 1 mol/L as the supporting electrolyte and LiBOB at a concentration of 0.05 mol/L as the coat-forming agent in a mixed solvent containing EC, EMC and DMC at a volumetric ratio of EC:EMC:DMC=1:1:1. Additionally, samples containing 15-crown-5-ether as a sodium trapping agent were adjusted so that the ratio A/X of the amount of 15-crown-5-ether (A moles) to the amount of sodium ions leached into the nonaqueous electrolyte (X moles), which had been determined beforehand by the procedure described below, would be the values shown for Examples 1 to 6 in Table 1 below. Thus, nonaqueous electrolyte secondary batteries (battery assemblies) of Examples 1 to 6 were prepared.

<Measurement of Amount of Leached Sodium Ions>

The amount of sodium ions (X moles) that leach into the nonaqueous electrolyte from the electrode assembly was calculated beforehand. More specifically, an electrode assembly with dimensions of approximately 10 (cm)*10 (cm) for determining the amount of leached sodium ions was cut from the electrode assembly comprising the positive electrode, separator, and negative electrode in the laminated state before winding. Moreover, the nonaqueous electrolyte was prepared using a mixed solvent containing EC, EMC and DMC in a volumetric ratio of EC:EMC:DC=1:1:1: with $LiPF_6$ at a concentration of 1 mol/L as the supporting electrolyte.

Then the amount of leached sodium ions (amount of leached $Na^+$) that leached from the electrode assembly for evaluation into the nonaqueous electrolyte was measured. First, contaminants were gently washed away by applying a stream of prepared nonaqueous electrolyte to the electrode assembly for evaluation. Then the electrode assembly for evaluation was immersed for 24 hours in 5 mL of the nonaqueous electrolyte. Next the nonaqueous electrolyte was filtered through a microporous film filter with a pore diameter of 0.2 micrometers, and the amount of sodium ions dissolved in the nonaqueous electrolyte was measured by inductive coupling plasma (ICP) emission analysis. The dissolved amount of sodium ions that leached from the electrode assembly for evaluation in this example was 20 mmol/L. From these measurements, the amount (X) of sodium ions that leached into the nonaqueous electrolyte in the assembled nonaqueous electrolyte secondary battery (battery assembly) was calculated to be 5 mmol.

<Initial Charge/Discharge Treatment>

For the initial charge/discharge treatment, CC charging was carried out on the batteries of Examples 1 to 6 with the above configurations at a constant current of 1 C until an inter-terminal voltage of 4.1 V was reached, and after a 5 minute rest period, charging was carried out for 1.5 hours by CV charging.

<Confirmation of Precipitate>

The batteries were disassembled after the initial charge/discharge treatment, and the negative electrode was removed from the wound electrode assembly and gently rinsed several times with the nonaqueous solvent. The distribution status of constituent components of the coat (precipitate) formed on the surface of the negative electrode was analyzed by TOF-SIMS. The results showed that in the battery of Example 1 a component derived from NaBOB had precipitated at both edges in the widthwise direction of the negative electrode active material layer. The combining of Na with LiBOB formed the precipitate, and the infiltration of LiBOB appears to be obstructed by the NaBOB.

A similar analysis was performed on the batteries of Examples 2 and 6. The results revealed that although a component derived from NaBOB was detected at both edges in the widthwise direction of the active material layers of the negative electrodes of those batteries, the amount was clearly smaller than in Example 1. On the other hand, non-uniformity in the component derived from LiBOB was not found at the negative electrode.

Almost no white precipitate derived from NaBOB was found in the negative electrodes of Examples 3 to 5. More specifically, it appears that by adding a suitable amount of the sodium trap to the nonaqueous electrolyte, the sodium that leached from the electrode assembly was rapidly trapped by the sodium-trapping agent, and this prevented the reaction itself between the sodium and the LiBOB.

<Evaluation of Reaction Resistance of Negative Electrode>

After the precipitation conditions of the precipitate were confirmed in the negative electrodes of Examples 1 to 6, alternating current impedance was used to measure the reaction resistance (Re) at the edge in the widthwise direction of the negative electrode and the reaction resistance (Rc) in the center under the conditions described below. When performing the alternating current impedance measurement, the electrodes were arranged at a gap of 5 mm in the direction following the edge of the negative electrode (lengthwise direction), the reaction resistance (Re) was measured at a point 5 mm from the edge of the negative electrode in the widthwise direction, and the reaction resistance (Rc) was measured at the center of the negative electrode in the widthwise direction. The resulting Cole-Cole plot was fitted to the equivalent circuit, and the reaction resistance at the edge (Re) and the reaction resistance at the center (Rc) were calculated. The uniformity of the coat formed on the surface of the negative electrode was evaluated from the difference in these resistance values (delta R=Re−Rc). The results are shown in Table 1 and FIG. 4.

<<Reaction Resistance Measurement Conditions>>

Apparatus: Solartron "model 1287 potentiostat/galvanostat" and "model 1255B frequency response analyzer (FRA)"

Measurement frequency: $10^{-2}$ to $10^5$ Hz
Measurement temperature: 25 degrees C.
Measurement method: 2 terminal method
Analytical software: ZPlot/CorrWare

TABLE 1

| Example | A/X | ΔR (Ω) |
|---|---|---|
| 1 | 0 | 0.7 |
| 2 | 0.2 | 0.5 |

TABLE 1-continued

| Example | A/X | ΔR (Ω) |
|---|---|---|
| 3 | 0.5 | 0.02 |
| 4 | 1.0 | 0.02 |
| 5 | 1.2 | 0.01 |
| 6 | 2.0 | 0.3 |

Figure 4:
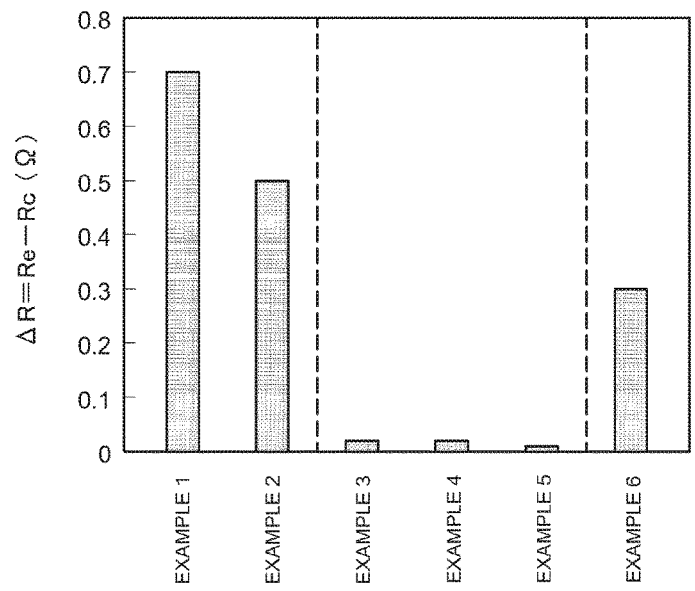
FIG. 4 is a graph showing the relationship between the compositions of the nonaqueous electrolyte and the difference in reaction resistance (delta R) at the edges and in the center of the negative electrode in the nonaqueous electrolyte secondary battery of the examples.

As shown in Table 1 and FIG. 4, it was confirmed that adding the sodium trapping agent to the nonaqueous electrolyte significantly reduced the difference in reaction resistance (delta R) between the edge in the widthwise direction and the center of the negative electrode. In this embodiment, a decrease in the difference in reaction resistance was confirmed in all the examples wherein the ratio of the amount of sodium ions (X) in the nonaqueous electrolyte to the amount of sodium trapping agent (A) added to the nonaqueous electrolyte (A/X) was adjusted to 2 or less. Furthermore, this effect was particularly pronounced in the range wherein (A/X) was greater than 0.2 and less than 2.0, and it was found that when adjusted to a range of 0.5 to 1.2, for example, there was almost no difference in reaction resistance (delta R). This is believed to result from the fact that the non-uniformity of infiltration of the nonaqueous electrolyte was suitably eliminated because the sodium-trapping agent rapidly trapped the sodium ions that had leached into the nonaqueous electrolyte from the electrode assembly, and the reaction thereof with LiBOB and precipitation of Na(BOB) were prevented. From these findings it is also believed that in the negative electrodes of Examples 2 to 6, more uniform and high quality LiBOB-derived SEI coats were formed on the surface of the negative electrode than on the negative electrode of Example 1. Furthermore, the range in this embodiment can be considered appropriate because it appears that if the added amount of sodium trapping agent is too small, trapping of the sodium ions will not sufficiently occur, and if the added amount is too large, the viscosity of the electrolyte will increase and reaction resistance will increase.

<Evaluation of Reaction Resistance of Negative Electrode>

The reaction resistance of the entire negative electrode (R) was measured in the negative electrodes of Examples 1 to 6 that were evaluated for non-uniformity in reaction resistance using alternating current impedance under the following conditions. When performing the measurements, a measurement cell was configured by cutting the negative electrode into a 20 mm length in the lengthwise direction (i.e., 20 mm*negative electrode width) and using a metal lithium electrode of the same dimensions as the counter electrode. The conditions for the alternating current impedance measurement were the same as for the measurement of reaction resistance noted above. The resulting Cole-Cole plot was fitted to the equivalent circuit, and the reaction resistance (R) of the negative electrode over the entire widthwise direction was calculated. The results are shown in Table 2 and FIG. 5 as a relative value (%) when the reaction resistance of the negative electrode of Example 1 is assigned a value of 100 (reference value).

TABLE 2

| Example | A/X | R Relative resistance (%) |
|---|---|---|
| 1 | 0 | 100 |
| 2 | 0.2 | 99.4 |
| 3 | 0.5 | 90.0 |

TABLE 2-continued

| Example | A/X | R Relative resistance (%) |
|---|---|---|
| 4 | 1.0 | 89.2 |
| 5 | 1.2 | 89.5 |
| 6 | 2.0 | 97.0 |

Figure 5:
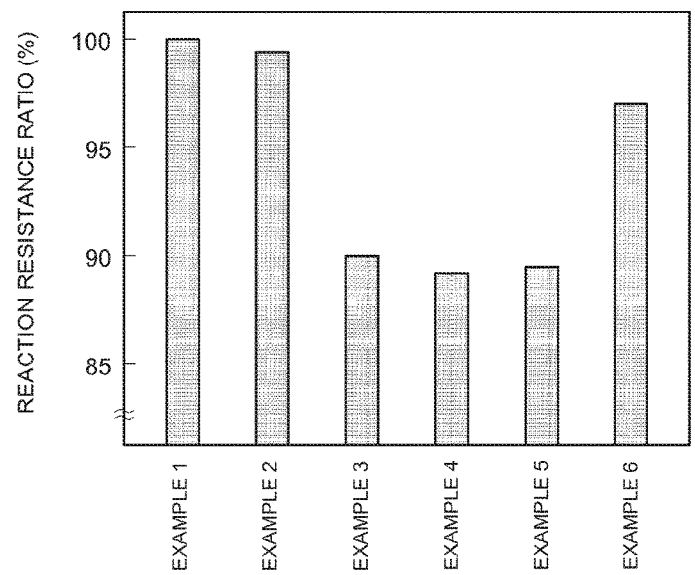
FIG. 5 is a graph showing the relationship between the reaction resistance of the negative electrode and compositions of the nonaqueous electrolyte in the nonaqueous electrolyte secondary battery of the examples.

As shown in Table 2 and FIG. 5, in comparison with Example 1, wherein the sodium-trapping agent was not added to the nonaqueous electrolyte, there was a smaller difference in resistance between the edges and the center of the negative electrode in Examples 2 to 6, wherein the sodium-trapping agent was added. Therefore, it was confirmed that the reaction resistance of the entire negative electrode was kept low in the batteries of Examples 2 to 6. Moreover, when the ratio of the amount of sodium ions (X) that leach into the nonaqueous electrolyte from the electrode assembly to the amount of sodium trapping agent (A) added to the nonaqueous electrolyte (A/X) was 0.5 or more to 1.2 or less (i.e., Examples 3 to 5), the reaction resistance of the entire negative electrode was suppressed even more. These findings demonstrate that the effect of the present invention is more fully exhibited and battery performance can be increased even more by suitably adjusting the amount of the sodium-trapping agent in the nonaqueous electrolyte to match the amount of sodium ions that leach from the electrode assembly constituting the battery.

Concrete embodiments of the present invention have been described in detail, but these are merely examples and by no means limit the scope of the claims. The technology described in the claims includes a variety of modifications and changes in the concrete embodiments exemplified above.

REFERENCE SIGNS LIST

10 Battery case
12 Case body
14 Sealing member
20 Electrode assembly
30 Positive electrode
32 Positive current collector
34 Positive electrode active material layer
40 Negative electrode
42 Negative current collector
44 Negative electrode active material layer
50 Separator
60 Positive terminal
70 Negative terminal
100 Nonaqueous electrolyte secondary battery

The invention claimed is:

1. A nonaqueous electrolyte secondary battery comprising:
an electrode assembly including a positive electrode, a separator and a negative electrode, the negative electrode including a negative current collector, a negative active material layer, containing a negative active material, formed on the surface of the current collector, and a coat, derived from an oxalato complex component, being provided on at least part of the surface of the negative active material layer;
a nonaqueous electrolyte containing a crown ether for forming a complex with a sodium ion; and
a battery case housing the electrode assembly and the nonaqueous electrolyte, wherein
a formula $0.5 \leq A/X \leq 1.2$ is satisfied, when a number of moles of sodium ions that leach into the nonaqueous electrolyte from the electrode assembly is assigned a value of X moles, and a number of moles of crown ether contained in the nonaqueous electrolyte is assigned a value of A moles, wherein
a difference ($\Delta R$) between a reaction resistance at edges and a reaction resistance in a center of a widthwise direction orthogonal to the lengthwise direction of the negative electrode is $0.5\Omega$ or less.

2. The nonaqueous electrolyte secondary battery according to claim 1, wherein
the crown ether contains carbon atoms, oxygen atoms, and hydrogen atoms, and
the crown ether has a ring structure formed of carbon-carbon bonds or ether bonds between the carbon atoms and the oxygen atoms.

3. The nonaqueous electrolyte secondary battery according to claim 1, wherein
the coat contains at least one of boron (B) and phosphorus (P) as a constituent atom of the oxalato complex component.

4. The nonaqueous electrolyte secondary battery according to claim 1, wherein
the nonaqueous electrolyte additionally contains an oxalato complex compound having an oxalato complex component of common origin with the coat.

5. The nonaqueous electrolyte secondary battery according to claim 4, wherein
the oxalato complex units contained in the coat and in the nonaqueous electrolyte have a ratio of 0.001 to 0.1 mol/L with respect to 1 L of the nonaqueous electrolyte.

6. The nonaqueous electrolyte secondary battery according to claim 4,
further comprising lithium bis(oxalato)borate as the oxalato complex compound.

7. The nonaqueous electrolyte secondary battery according to claim 1, wherein
in the positive electrode, a positive electrode active material layer is formed on an elongate positive current collector along the lengthwise direction of the positive current collector,
in the negative electrode, a negative electrode active material layer is formed on an elongate negative current collector along the lengthwise direction of the negative current collector, and
the electrode assembly is a wound electrode assembly prepared by laminating the elongate positive and negative electrodes opposing each other and then winding the laminated positive and negative electrodes in the lengthwise direction.

8. A nonaqueous electrolyte for a nonaqueous electrolyte secondary battery that contains an electrode assembly including a positive electrode, a separator and a negative electrode, and a nonaqueous electrolyte in a battery case, the nonaqueous electrolyte comprising:
an electrolyte;
a solvent to dissolve the electrolyte;
an oxalato complex compound as a coat-forming agent; and
a crown ether as a sodium-trapping agent, wherein,
when the concentration of the crown ether contained in the nonaqueous electrolyte is assigned a value of C (mol/L), the amount of the nonaqueous electrolyte contained in the nonaqueous electrolyte secondary battery is assigned a value of Z (L), and the number of moles of sodium ions that leach into the nonaqueous electrolyte from the electrode assembly is assigned a previously determined value of X mol, these values are adjusted to satisfy the formula $0.5 \leq C^*Z/X \leq 1.2$, and wherein a difference ($\Delta R$) between a reaction resistance at edges and a reaction resistance in a center of a widthwise direction orthogonal to the lengthwise direction of the negative electrode is $0.5\Omega$ or less.

9. The nonaqueous electrolyte secondary battery according to claim 1, wherein the crown ether contains 15-crown-5-ether.

10. The nonaqueous electrolyte secondary battery according to claim 1, wherein the a negative active material layer includes carboxymethylcellulose.

* * * * *